US008279246B2

(12) United States Patent
Oshita et al.

(10) Patent No.: US 8,279,246 B2
(45) Date of Patent: Oct. 2, 2012

(54) DISPLAY CONTROL APPARATUS FOR ENHANCING THE VISIBILITY OF DISPLAYED INFORMATION

(75) Inventors: Yuuki Oshita, Fussa (JP); Koichi Matsuzawa, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 973 days.

(21) Appl. No.: 12/043,281

(22) Filed: Mar. 6, 2008

(65) Prior Publication Data

US 2008/0225039 A1 Sep. 18, 2008

(30) Foreign Application Priority Data

Mar. 15, 2007 (JP) ................................. 2007-067424

(51) Int. Cl.
*G09G 5/00* (2006.01)
*G06F 3/038* (2006.01)
*G06K 15/00* (2006.01)
*H04N 1/405* (2006.01)

(52) U.S. Cl. ......... 345/698; 345/204; 358/3.1; 358/3.12

(58) Field of Classification Search .................. 345/698; 358/3.1-3.13
See application file for complete search history.

(56) References Cited

U.S. PATENT DOCUMENTS

2004/0239792 A1 12/2004 Shibutani et al.

FOREIGN PATENT DOCUMENTS

| | | | |
|---|---|---|---|
| CN | 1685714 | A | 10/2005 |
| JP | 7-261720 | A | 10/1995 |
| JP | 9-54322 | A | 2/1997 |
| JP | 11-175047 | A | 7/1999 |
| JP | 2001-013945 | A | 1/2001 |

OTHER PUBLICATIONS

Chinese Office Action dated Aug. 21, 2009 (4 pages), and English translation thereof (6 pages), issued in counterpart Chinese Application Serial No. 2008100817943.
Japanese Office Action dated Apr. 17, 2012 (and English translation thereof) in counterpart Japanese Application No. 2007-067424.

*Primary Examiner* — Srilakshmi K Kumar
(74) *Attorney, Agent, or Firm* — Holtz, Holtz, Goodman & Chick, PC

(57) ABSTRACT

A display control apparatus which improves the visibility of a display unit (for example, wristwatch) having a normal display section and a normal non-display section provided outside the normal display section along its at least one side. When it is not sensed that the display unit is inclined at a predetermined angle to a horizontal surface, time information is displayed in a normal size on the normal display section. When it is sensed that the display unit is inclined at the predetermined angle to the horizontal surface, the time information is displayed in an enlarged size on a whole of the normal display and non-display sections for a predetermined time.

6 Claims, 7 Drawing Sheets

FIG.5

| | F | E | D | C | B | A | 9 | 8 | 7 | 6 | 5 | 4 | 3 | 2 | 1 | 0 | |
|---|---|---|---|---|---|---|---|---|---|---|---|---|---|---|---|---|---|
| 0 | WK0F | WK0E | WK0D | WK0C | WK0B | WK0A | WK09 | WK08 | WK07 | WK06 | WK05 | WK04 | WK03 | WK02 | WK01 | WK00 | 0 |
| 1 | WK1F | WK1E | WK1D | WK1C | WK1B | WK1A | WK19 | WK18 | WK17 | WK16 | WK15 | WK14 | WK13 | WK12 | WK11 | WK10 | 1 |
| 2 | WK2F | WK2E | WK2D | WK2C | WK2B | WK2A | WK29 | WK28 | WK27 | WK26 | WK25 | WK24 | WK23 | WK22 | WK21 | WK20 | 2 |
| 3 | WK3F | WK3E | WK3D | WK3C | WK3B | WK3A | WK39 | WK38 | WK37 | WK36 | WK35 | WK34 | WK33 | WK32 | WK31 | WK30 | 3 |
| 4 | X0Y5 | X1Y5 | X2Y5 | X3Y5 | | X4Y5 | X5Y5 | X6Y5 | X7Y5 | | X8Y5 | X9Y5 | X10Y5 | X11Y5 | | | 4 |
| 5 | X12Y5 | X13Y5 | X14Y5 | X15Y5 | | X16Y5 | X17Y5 | X18Y5 | | | | | | | | | 5 |
| 6 | X0Y6 | X1Y6 | X2Y6 | X3Y6 | | X4Y6 | X5Y6 | X6Y6 | X7Y6 | | X8Y6 | X9Y6 | X10Y6 | X11Y6 | | | 6 |
| 7 | X12Y6 | X13Y6 | X14Y6 | X15Y6 | | X16Y6 | X17Y6 | X18Y6 | | | | | | | | | 7 |
| 8 | X0Y1 | X1Y1 | X2Y1 | X3Y1 | | X4Y1 | X5Y1 | X6Y1 | X7Y1 | | X8Y1 | X9Y1 | X10Y1 | X11Y1 | | | 8 |
| 9 | X12Y1 | X13Y1 | X14Y1 | X15Y1 | | X16Y1 | X17Y1 | X18Y1 | | | | | | | | | 9 |
| A | X0Y0 | X1Y0 | X2Y0 | X3Y0 | | X4Y0 | X5Y0 | X6Y0 | X7Y0 | | X8Y0 | X9Y0 | X10Y0 | X11Y0 | | | A |
| B | X12Y0 | X13Y0 | X14Y0 | X15Y0 | | X16Y0 | X17Y0 | X18Y0 | | | | | | | | | B |
| C | | | | | | | | | | | | | | | | | C |
| D | | | | | | | | | | | | | | | | | D |
| E | | | | | | | | | | | | | | | | | E |
| F | | | | | | | | | | | | | | | | | F |
| | F | E | D | C | B | A | 9 | 8 | 7 | 6 | 5 | 4 | 3 | 2 | 1 | 0 | |

31 (rows 4–5), 33 (rows 6–7), 32 (rows 8–9), 34 (rows A–B)

INCLINATION IS SENSED

2 SECONDS

DISPLAY CONTROL APPARATUS FOR ENHANCING THE VISIBILITY OF DISPLAYED INFORMATION

FIELD OF THE INVENTION

The present invention relates to display control apparatus and programs for displaying character information on a display area.

BACKGROUND OF THE INVENTION

In the past, there have been demands to enhance the visibility of displays of electronic display devices. As techniques therefore, for example, Published Unexamined Japanese Patent Application TOKKAIHEI 9-54322 discloses an electronic wristwatch which improves the visibility of character information displayed on its small display. This wristwatch comprises a display front, an hour-display character film, a first EL element, a liquid crystal display element, a second EL element, and a reflector arranged in this order. In this wristwatch, the first and second EL elements emit light which illumine the hour-display character film and liquid crystal display such that their displayed contents, respectively, are visible easily.

Another electronic wristwatch is known which includes an inclination switch which turns off a power source for a display thereof when the wristwatch is placed in a non-inclined state or kept in a certain inclined state and turns on the power source when a change in the inclination of the wristwatch is sensed, thereby operating the display, for power saving purposes.

It is therefore an object of the present invention to provide a display control apparatus and program which display character information on a display unit in an enlarged size when it is sensed that the display unit is inclined at a predetermined angle to a predetermined reference, in order to improve the visibility of the displayed character information.

SUMMARY OF THE INVENTION

In order to achieve the above object, in one aspect the present invention provides a display control apparatus which comprises a display unit comprising a normal display section with at least one side and a normal non-display section provided outside the normal display section along the one side. An inclination sensor senses that the display unit is inclined at a predetermined angle to a predetermined reference. A display size control unit displays the character information in a normal size on the normal display section of the display unit when the inclination sensor fails to sense that the display unit is inclined at the predetermined angle to the predetermined reference, and displays the character information in an enlarged size on a whole of the normal display and non-display sections of the display unit when the inclination sensor senses that the display unit is inclined at the predetermined angle to the predetermined reference.

Therefore, according to this display control apparatus, when it is sensed that the display unit is inclined at the predetermined angle to the predetermined reference, the character information is displayed in the enlarged size and the visibility of the displayed character information is enhanced when the display unit is looked at from outside.

In order to achieve the above object, in a second aspect the present invention also provides a display control apparatus comprising a display unit that in turn comprises a normal display section with at least one side and a normal non-display section provided outside the normal display section along the at least one side. An inclination sensor senses that the display unit is inclined at a predetermined angle to a predetermined reference. A display controller selects one of a normal display mode in which character information is displayed in a normal size on the normal display section of the display unit and an enlarged display mode in which the character information is displayed in an enlarged size on a whole of both the normal display and non-display sections of the display unit. The display control unit selects and maintains the enlarged display mode for a predetermined time, in response to sensing that the display unit is inclined at the predetermined angle to the predetermined reference in the normal display mode.

Therefore, according to this display control apparatus, when it is sensed that the display unit is inclined at the predetermined angle to the predetermined reference in the normal display mode, the character information is displayed in the enlarged size as in the first aspect for the predetermined time and the visibility of the displayed character information is furthermore enhanced when the displayed character information is looked at from outside.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below serve to explain the principles of the present invention in which:

FIG. 5 illustrates a schematic of a RAM whose data is rewriteable by the display control apparatus;

DESCRIPTION OF THE PREFERRED EMBODIMENT

Figure 1:
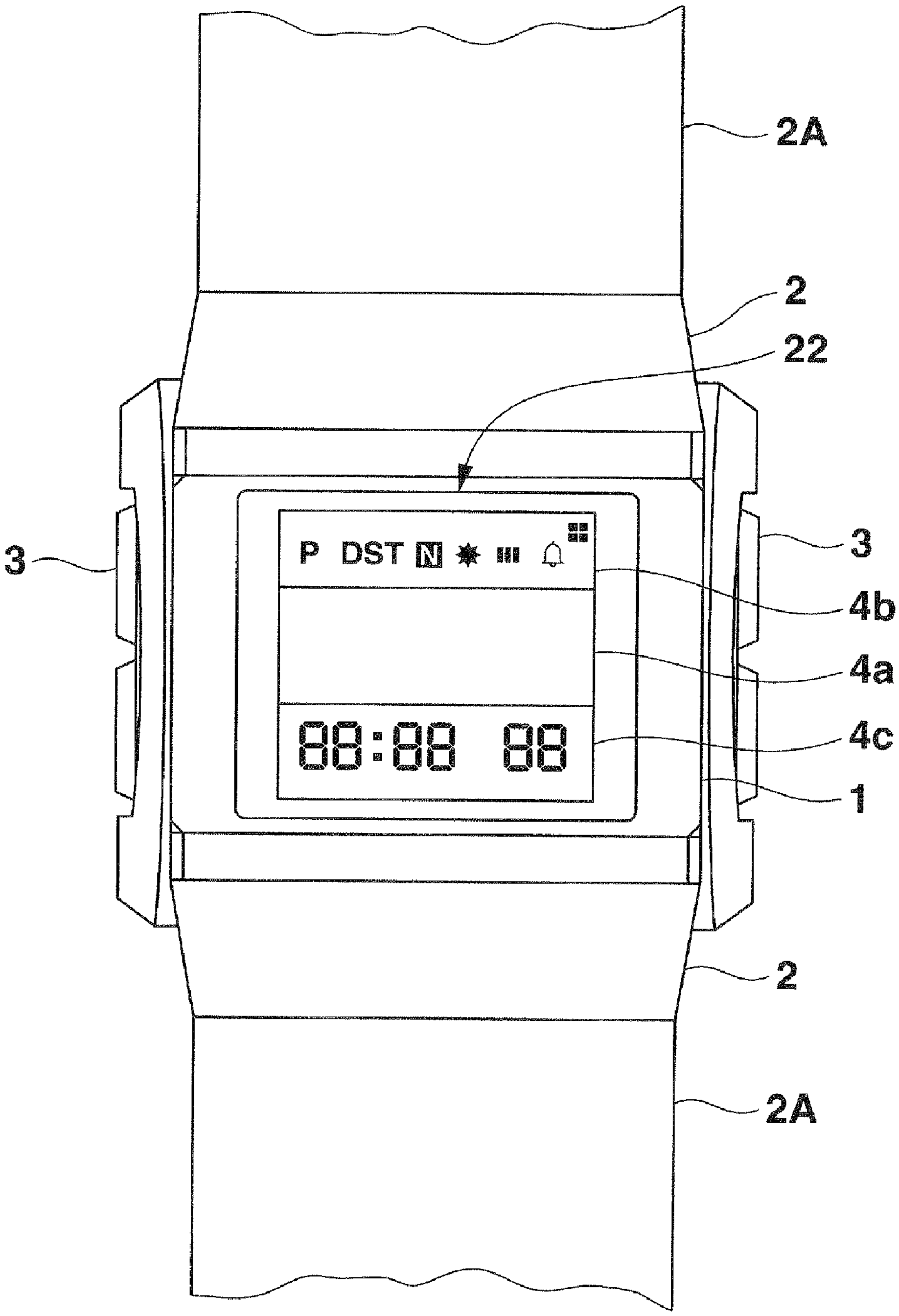
FIG. 1 is a front view of an electronic wristwatch that includes a built-in display control apparatus according to the present invention.
Figure 2:
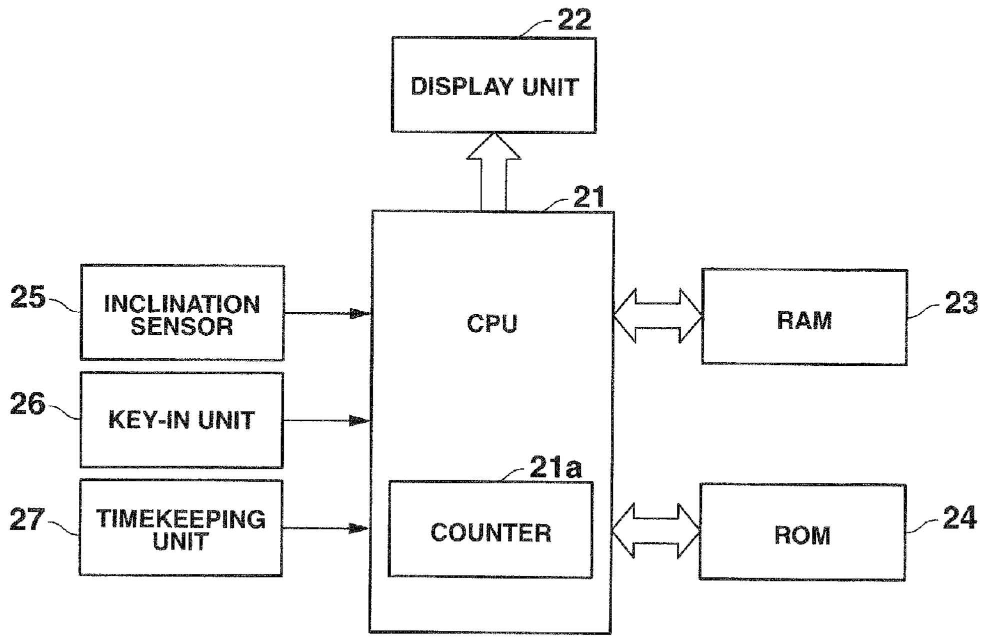
FIG. 2 is a block diagram of the electronic wristwatch that includes the display control apparatus.

Referring to FIGS. 1 and 2, a display control apparatus and program according to one embodiment of the present invention is built in an electronic wristwatch of FIG. 1. The wristwatch is adapted to be worn on a user's wrist by a wristband 2A attached at opposite ends to a case 1 of the wristwatch through corresponding attaching members 2. A plurality of push button switches 3 are provided on sides of the case 1 to set time, adjust a display brightness, etc.

The wristwatch has at the front of the case 1 a display unit 22 (FIG. 2) which is composed of a time display section 4_a_, a setting display section 4_b_ and a "current date/day of the week/seconds" display section 4*c*. The time display section 4*a* is composed of a dot matrix type liquid crystal display mechanism, which will be driven to display "hours" and "minutes" time information indicated, for example, with numerals/alphabets, by selectively activating associated ones of square display dot areas arranged in rows and columns composing a display matrix. The setting display section 4*b* displays icons indicative of a current set (on or off) state of an alarm. The "current date/day of the week/seconds" display section 4*c* displays a current date, a current day of the week and current seconds of time in numerals or alphabetic letters of 7 segments which will be selectively activated or deactivated.

As shown in FIG. 2, in addition to the display unit 22 the wristwatch further comprises a display controller 21 including a computer or CPU 21 and a ROM 24 that has stored a display control program to cause the CPU 21 to perform its various functions, including display of current time information on the display section 4*a* based on clock pulse signals from a crystal oscillator (not shown).

Figure 7A:
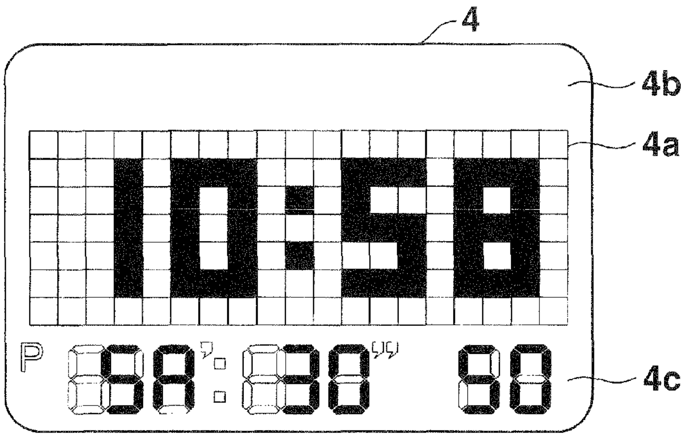
FIGS. 7A, 7B, and 7C illustrate a transition of time information displays which will be switched by the display control apparatus.
Figure 7B:
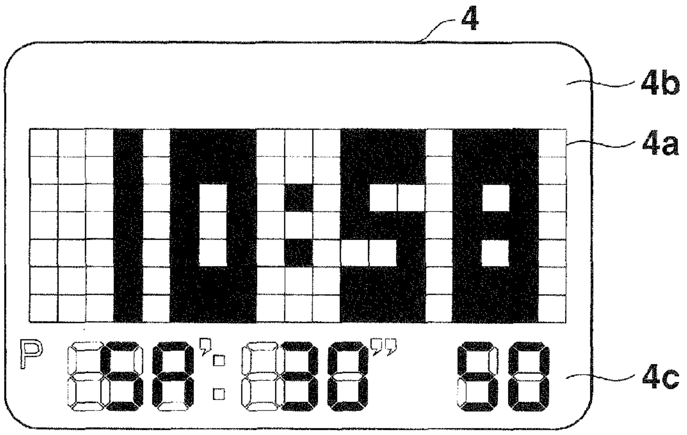
Figure 7C:
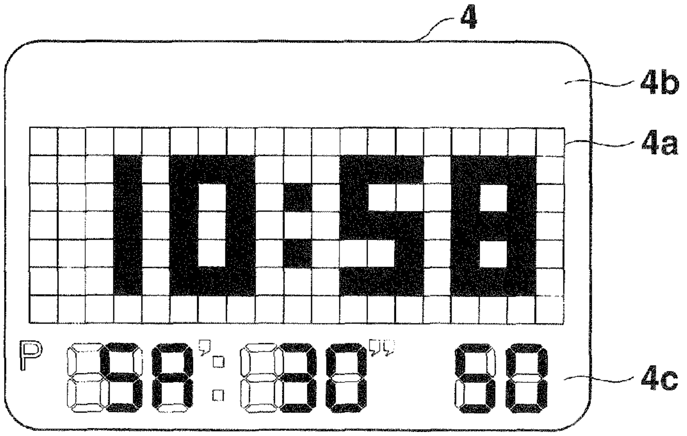

The display controller 21 displays numerical time information in a switching manner, as shown in FIGS. 7A-7C. When the display controller 21 senses that the wristwatch is inclined at a predetermined angle to a horizontal surface during display of the time information in a normal size on the time display section 4*a*, as shown in FIG. 7A, the display controller 21 displays the time information in an enlarged size on the display section 4*a* for a predetermined time, for example, of 2 seconds in this embodiment, as shown in FIG. 7B. Thereafter, the size of the displayed time information is returned to its normal size, as shown in FIG. 7C. Display modes involving FIGS. 7A and 7C where the time information is displayed in the normal size are hereinafter referred to as a "normal display mode" while the display mode involving FIG. 7B where the information is shown in an enlarged size is hereinafter referred to as an "enlarged display mode".

Figure 3:
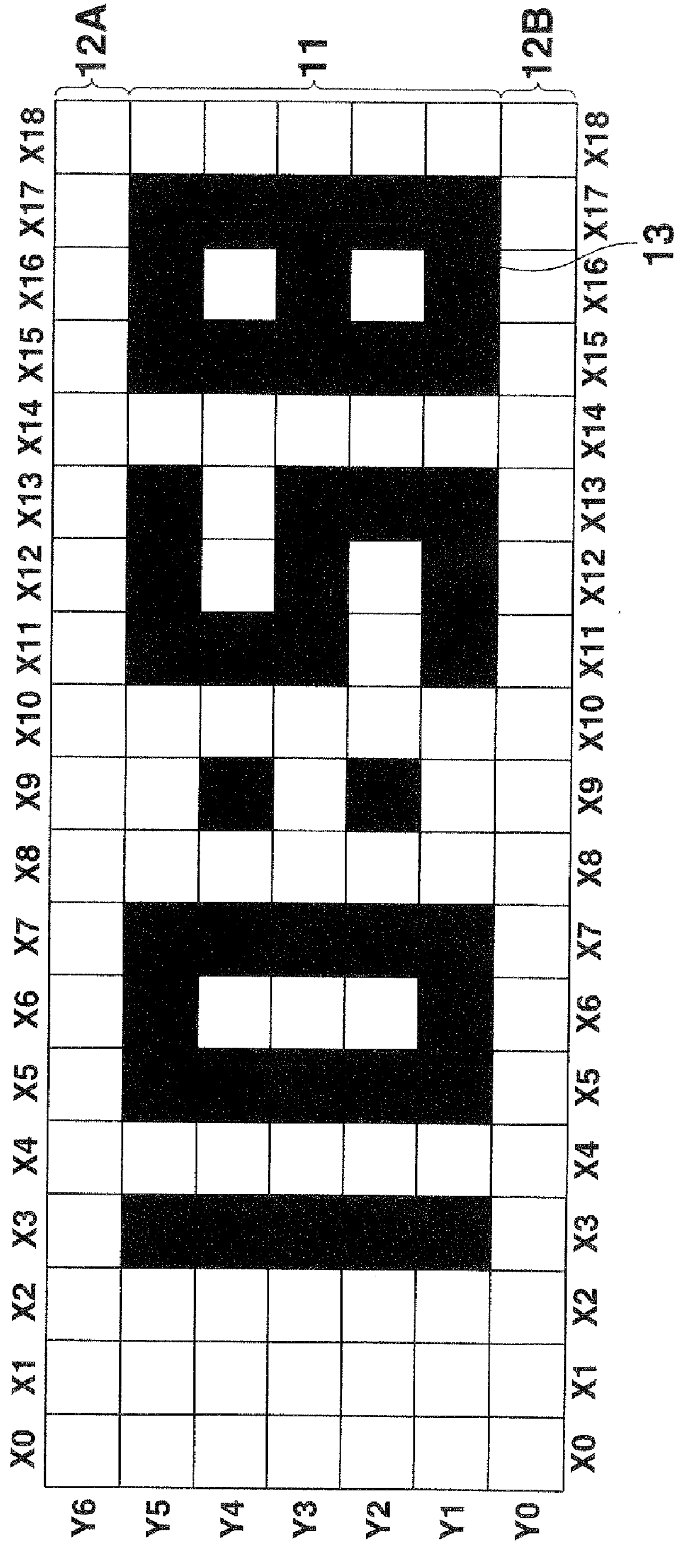
FIG. 3 illustrates time information displayed on a display unit in a normal display mode by the display control apparatus according to the present invention.

As shown in FIG. 3, the time display section 4*a* includes a matrix of small square display dot areas 13 arranged in 7 rows (Y0-Y6)×19 columns (X0-X18) where dot areas forming displayed numerals are activated so as to be displayed emphatically in a different manner from the other dot areas. The areas of the rows Y1-Y5 compose a normal display subsection 11 which displays time information in the normal display mode. The areas of the rows Y6 and Y0 compose the uppermost and lowermost normal non-display subsections 12A and 12B, respectively, which are not used in the normal display mode.

Figure 4:
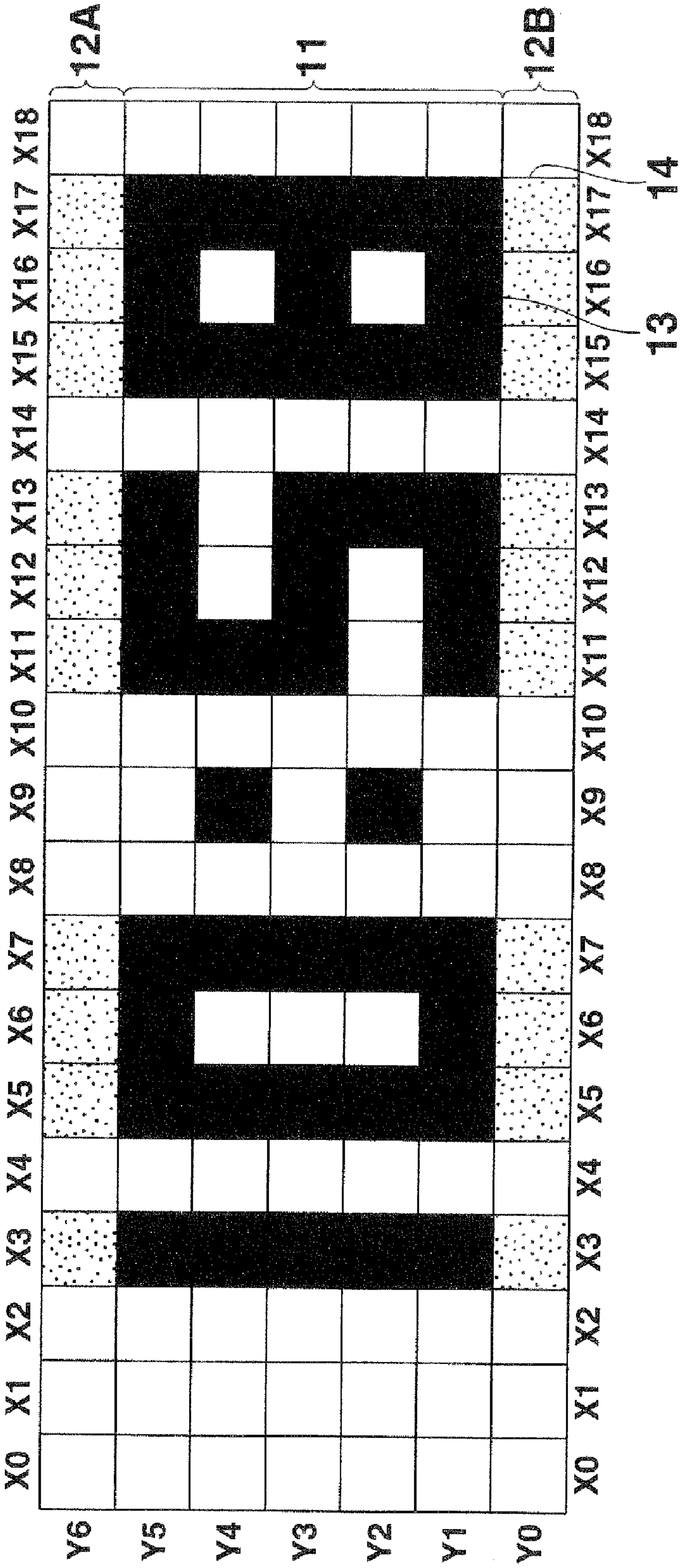
FIG. 4 illustrates time information displayed on the display unit in an enlarged display mode by the display control apparatus according to the present invention.

As shown in FIG. 4, in the enlarged display mode, data on respective activated/deactivated dot areas 13 in the dot areas of the uppermost and lowermost rows Y5 and Y1 of the normal display subsection 11 are copied into as incremental dot data 14 in corresponding dot areas of the uppermost and lowermost normal non-display subsections 12A and 12B, respectively, as shown in FIG. 4 for enlarged display of the time information.

As shown in FIG. 2, in the electronic wristwatch, the ROM 24, the display unit 22, a working RAM 23, an inclination sensor or switch 25, a key-in unit 26 and a timekeeping unit 27 are connected to the display controller or CPU 21.

As shown in FIG. 5, the RAM 23 has storage areas arranged in 16 rows×16 columns including those corresponding to the dot areas of the display matrix of the display unit 22 and time information to be displayed on the time display section 4*a*. The time information may include attribute values each, for example, indicative of white or black dot display data. The RAM 23 is managed in a hexadecimal system.

The RAM 23 has storage rows 31 and 32 which store display data for the uppermost and lowermost rows Y5 and Y1, respectively, of the normal display subsection 11. In FIG. 5, note that the storage areas corresponding to rows Y4-Y2 of the normal display subsection 11 are not shown. The RAM 23 further has storage areas 33 and 34 which store display data for rows Y6 and Y0 composing the normal non-display subsections 12A and 12B, respectively.

As described above, the ROM 24 has stored the display control program in accordance with which the CPU 21 (or computer) switches the display mode between the normal display mode and the enlarged display mode, thereby performing a corresponding display operation.

When the display unit 22 or its display section 4*a* is inclined at a predetermined angle from a horizontal surface, the inclination sensor 25 will sense this state and delivers a corresponding signal to the CPU 21.

The key-in unit 26 senses operation of any one of the push button switches 3 and delivers a corresponding signal to the CPU 21, thereby causing the CPU 21 to change various settings and sets time.

The timekeeping unit 27 includes a crystal oscillator (not shown) which provides timekeeping signals cyclically to the CPU 21. Based on these signals, the CPU 21 updates time information displayed on the time display section 4*a* and "seconds of time" information displayed on the date/second display section 4*c*.

The CPU 21 updates the display data stored in the ROM 24 and hence the time information displayed on the time display section 4*a* in accordance with the display control program stored in the ROM 24. The CPU 21 selects the enlarged display mode for the time display section 4*a* based on the signal from the inclination sensor 25 for enhancing the visibility of the time information.

The CPU 21 comprises a counter 21*a* which starts to count up the number of clock pulses from the timekeeping unit 27 when the enlarged display mode is selected. When the counter 21*a* indicates a predetermined count, the CPU 21 returns the display mode from the enlarged display mode to the normal display mode.

Figure 6:
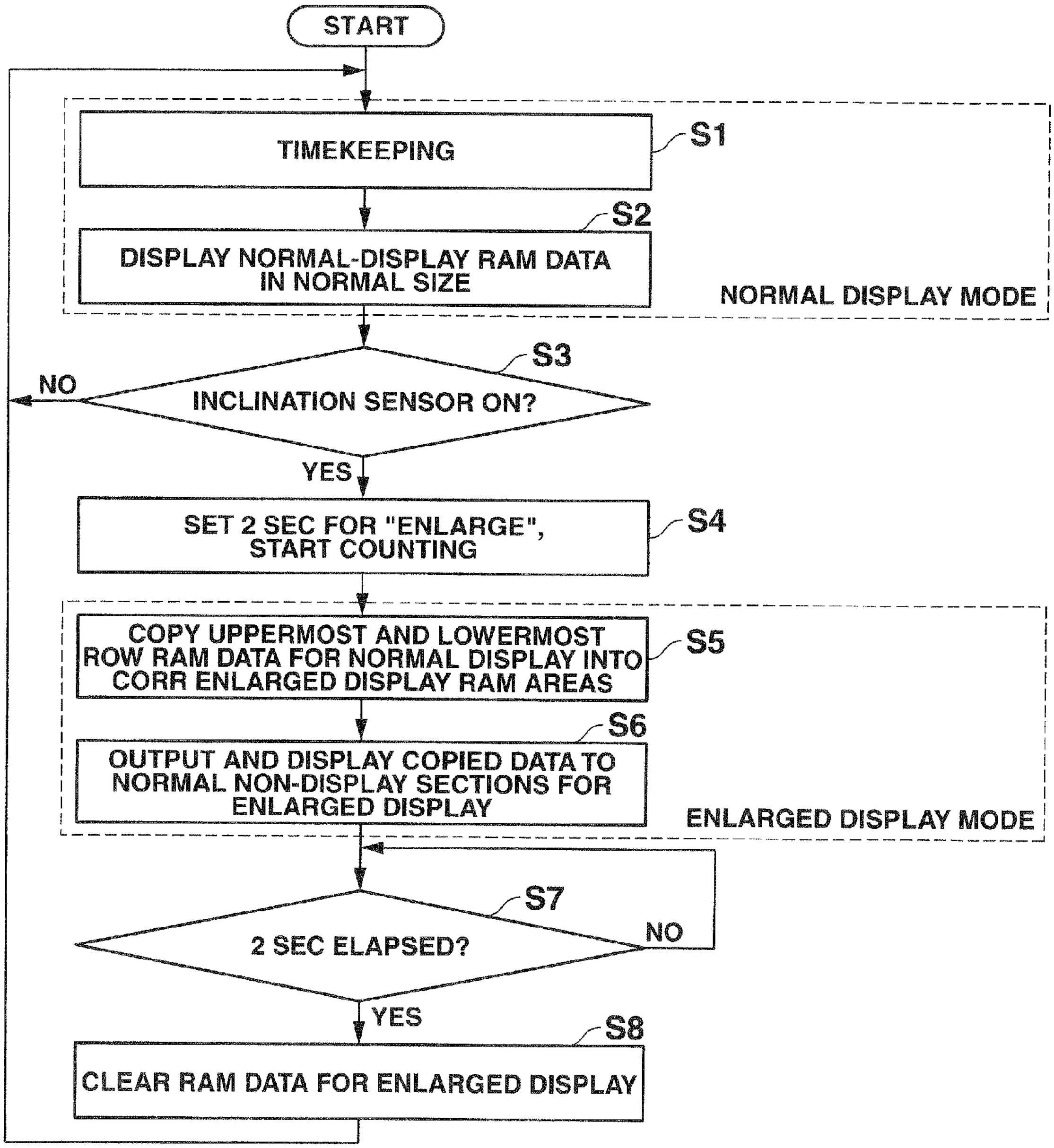
FIG. 6 is a flowchart indicative of switching of time information display in the normal display mode to that in the enlarged display mode by the display control apparatus in response to sensing of a horizontal state of the display unit of the display control apparatus.

Now, operation of the electronic wristwatch will be described with reference to a flowchart of FIG. 6 to be performed by executing the display control program stored in the ROM 24.

When failing to sense that the display unit 22 is inclined at the predetermined angle, the CPU 21 displays time information in the normal display subsection 11 in the normal display mode, as shown in FIGS. 7A and 3. In this case, the CPU 21 recognizes a current time based on timekeeping signals from the timekeeping unit 27 in step S1, and updates display data stored in the storage areas, including the storage areas 31 and 32, of the RAM 23 corresponding to the normal display subsection 11 in step S2.

During display of time information in the normal display subsection 11 in the normal display mode, the CPU 21 determines at predetermined intervals of time whether the electronic wristwatch is inclined at the predetermined angle based on sensing signals coming from the inclination sensor 25 which, produced once, will be detected necessarily by the CPU 21. When the sensor 25 senses that the electronic wristwatch is inclined at the predetermined angle and delivers a corresponding signal to the CPU 21, the CPU 21 then responds to this signal and then goes to step S4.

In step S4, the CPU 21 sets 2 seconds as the predetermined duration time for which the time information is displayed in the enlarged display mode, which causes the counter 21*a* to count up the number of clock pulse signals.

In step S5, in order to change the display mode from the normal display mode to the enlarged display mode, the CPU 21 updates the display data in the RAM 23. That is, the CPU 21 copies the display data stored in the storage areas 31 and 32 of the RAM 23 corresponding to the uppermost and lowermost normal display row areas of the normal display subsection 11 into the corresponding storage areas 33 and 34, respectively, of the RAM 23

In step S6, the CPU 21 reads the display data copied into the display storage areas 33 and 34 in step S5 and the display data stored in the storage areas corresponding to the normal display subsection 11 and then outputs them to the time display section 4*a*. This switches the display of the display unit 22 from the normal display mode where only the normal display subsection 11 of FIGS. 7A and 3 displays time information to the enlarged display mode where a whole of the normal display subsection 11 and the normal non-display subsections 12A and 12B displays time information, as shown in FIGS. 7B and 4.

In step S7, the CPU 21 determines whether the counter 21*a* has counted up the number of clock pulses corresponding to 2 seconds since the start of the counting thereof. If not, display of the time information in the enlarged display mode continues. When the count of the counter has reached the one corresponding to 2 seconds, the CPU 21 then goes to step S8.

In step S8, the CPU 21 clears the display data stored both in the display storage areas 33 and 34. Then, the CPU 21 reads display data from the storage areas of the RAM 23 corresponding to the normal display subsection 11 that includes the storage areas 31 and 32, and then displays the data on the display unit 22. Thus, the display form of the display unit 22 is changed from that of FIGS. 7B and 4 in the enlarged display mode to that of FIGS. 7C and 3 in the normal display mode.

As described above, according to the inventive display control apparatus, the display mode is switched between the normal display mode in which the time information is displayed in the normal display subsection 11 and the enlarged display mode in which the time information is displayed in the enlarged size on the whole of the normal display subsection 11 and the normal non-display subsections 12A and 12B provided at the opposite sides of the normal display subsection 11. Switching of the display mode from the normal display mode to the enlarged display mode occurs when the time display section 4*a* is inclined at the predetermined angle to the horizontal surface, for example, by the user bending his or her wrist, on which the wristwatch is worn, before his or her breast to look at the time display well. At this time, the inclination sensor 25 senses that state of the time display section 4*a* and outputs a sensing signal. The CPU 21 responds to this signal to cause the time display section 4*a* to enlarge and display the time information in the enlarged display mode for the predetermined time, for example, of 2 seconds. That is, according to this wristwatch, when the user behaves so as to look at his or her wristwatch or takes bodily exercise, the display unit of the wristwatch can be inclined at the predetermined angle, thereby enhancing the visibility of the time display section 4*a*.

Enlargement of the displayed time information due to sensing of the predetermined inclination state of the display unit should be preferably performed only while the current time information is displayed on the time display section 4*a* excluding while information on any of the various settings being made is being displayed after confirmation of the current operation mode.

When sensing the predetermined inclination state of the display unit in the normal display mode, the CPU 21 is only required to copy the display data stored in the storage areas corresponding to the uppermost and lowermost rows of the normal display subsection 11 into the storage areas of the RAM corresponding to the normal non-display subsections 12A and 12B of the time display section 4*a*, thereby displaying the time information in the enlarged size in the display section comprising a whole of the normal display subsection 11 and the normal non-display subsections 12A and 12B. In this case, enlarged display of the time information is performed without the necessity of storing enlarged display fonts beforehand in addition to the normal display fonts. In addition, the information to be displayed may include alphabetical letters.

Further, according to this wristwatch, the user is able to enjoy enlarged display of time information on the display section 4*a* occurring when the predetermined inclined state of the display section 4*a* is sensed.

While in the above embodiment the electronic wristwatch to which the display control apparatus and program according to the present invention has been applied has been illustrated, the present invention is widely applicable to displays of other electronic devices such as, for example, electronic notebooks and/or mobile phones.

Various modifications and changes may be made thereunto without departing from the broad spirit and scope of this invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present, invention.

This application is based on Japanese Patent Application No. 2007-067424 filed on Mar. 15, 2007 and including specification, claims, drawings and summary. The disclosure of the above Japanese patent application is incorporated herein by reference in its entirety.

What is claimed is:

1. A display control apparatus comprising:

a display unit comprising a normal display section with at least one side and a normal non-display section provided outside the at least one side and along the at least one side of the normal display section, wherein a whole of the normal display and non-display sections of the display unit comprises a matrix of dot areas;

a storage device which comprises a plurality of areas therein, each storing display data for a respective one of the dot areas of the matrix of the display unit;

an inclination sensor that senses whether the display unit is inclined at a predetermined angle to a predetermined reference; and a display size control unit that displays character information in a normal size on the normal display section of the display unit when the inclination sensor fails to sense that the display unit is inclined at the predetermined angle to the predetermined reference, and displays the character information in an enlarged size on the whole of the normal display and non-display sections of the display unit when the inclination sensor senses that the display unit is inclined at the predetermined angle to the predetermined reference, wherein the display size control unit comprises a character information display control unit that: (i) when the character information is to be displayed in the normal size only on the normal display section, reads first display data from areas of the storage device corresponding to dot areas of the matrix of the normal display section of the display unit, and displays the read first display data as the character information in the normal size on the normal display section, and (ii) when the character information is to be displayed in the enlarged size on the whole of the normal display section and the normal non-display section provided outside the normal display section, copies second display data stored in areas of the storage device corresponding to dot areas of the matrix of the normal display section arranged along said at least one side into areas of the storage device corresponding to dot areas of the normal non-display section, reads the copied second display data, and displays the second display data as incremental display information on the normal non-display section, and wherein the second display data corresponds to only a part of the first display data arranged along said at least one side.

2. The display control apparatus of claim 1, wherein the display size control unit further comprises a copying/display control unit that, when the inclination sensor senses that the display unit is inclined at the predetermined angle to the predetermined reference, copies and displays the second display data stored in the areas of the storage device corresponding to only the dot areas of the normal display section which are arranged along the at least one side of the normal display section, into the areas of the storage device corresponding to the dot areas of the normal non-display section provided outside the normal display section.

3. A display control apparatus comprising:

a display unit comprising a normal display section with at least one side and a normal non-display section provided outside the at least one side and along the at least one side of the normal display section, wherein a whole of the normal display and non-display sections of the display unit comprises a matrix of dot areas;

a storage device which comprises a plurality of areas therein, each storing display data for a respective one of the dot areas of the matrix of the display unit;

an inclination sensor that senses whether the display unit is inclined at a predetermined angle to a predetermined reference; and a display controller that selects one of a normal display mode in which character information is displayed in a normal size on the normal display section of the display unit, and an enlarged display mode in which the character information is displayed in an enlarged size on the whole of the normal display and non-display sections of the display unit;

wherein the display controller selects and maintains the enlarged display mode for a predetermined time in response to sensing that the display unit is inclined at the predetermined angle to the predetermined reference in the normal display mode, wherein the display controller comprises a character information display control unit that: (i) when the character information is to be displayed in the normal display mode in the normal display section, reads first display data from areas of the storage device corresponding to dot areas of the matrix of the normal display section of the display unit, and displays the read first display data as the character information on the normal display section, and (ii) when the character information is to be displayed in the enlarged display mode on the whole of the normal display section and the normal non-display section provided outside the normal display section in a state in which the character information is displayed in the normal display mode on the normal display section, copies second display data stored in areas of the storage device corresponding to dot areas of the matrix of the normal display section arranged along said at least one side of the normal display section into areas of the storage device corresponding to dot areas of the normal non-display section, reads and displays the copied second display data as incremental display information on the normal non-display section, and wherein the second display data corresponds to only a part of the first display data arranged along said at least one side.

4. The display control apparatus of claim 3, further comprising a copying/display control unit which, when the inclination sensor senses that the display unit is inclined at the predetermined angle to the predetermined reference, copies and displays the second display data stored in the areas of the storage device corresponding to only the dot areas of the normal display section which are arranged along the at least one side, into the areas of the storage device corresponding to the dot areas of the normal non-display section provided outside the normal display section.

5. A display control method for a display control apparatus which comprises: (i) a display unit comprising a normal display section with at least one side and a normal non-display section provided outside the at least one side and along the at least one side of the normal display section, wherein a whole of the normal display and non-display sections of the display unit comprises a matrix of dot areas; (ii) a storage device comprising a plurality of areas therein, each storing display data for a respective one of the dot areas of the matrix of the display unit; and (iii) an inclination sensor that senses whether the display unit is inclined at a predetermined angle to a predetermined reference, the method comprising:

controlling a display size such that character information is displayed in a normal size on the normal display section of the display unit when the inclination sensor fails to sense that the display unit is inclined at the predetermined angle to the predetermined reference, and the character information is displayed in an enlarged size on the whole of the normal display and non-display sections of the display unit when the inclination sensor senses that the display unit is inclined at the predetermined angle to the predetermined reference, wherein when the character information is to be displayed in the normal size only on the normal display section, first display data is read from areas of the storage device corresponding to dot areas of the matrix of the normal display section of the display unit, and the read first display data is displayed as the character information in the normal size on the normal display section, wherein when the character information is to be displayed in the enlarged size on the whole of the normal display section and the normal non-display section provided outside the normal display section, second display data stored in areas of the storage device corresponding to dot areas of the matrix of the normal display section arranged along said at least one side is copied into areas of the storage device corresponding to dot areas of the normal non-display section, and the copied second display data is displayed as incremental display information on the normal non-display section, and wherein the second display data corresponds to only a part of the first display data arranged along said at least one side.

6. A display control method for a display control apparatus which comprises: (i) a display unit comprising a normal display section with at least one side and a normal non-display section provided outside the at least one side and along the at least one side of the normal display section, wherein a whole of the normal display and non-display sections of the display unit comprises a matrix of dot areas; (ii) a storage device comprising a plurality of areas therein, each storing display data for a respective one of the dot areas of the matrix of the display unit; and (iii) an inclination sensor that senses whether the display unit is inclined at a predetermined angle to a predetermined reference, the method comprising:

controlling a display by selecting one of a normal display mode in which character information is displayed in a normal size on the normal display section of the display unit, and an enlarged display mode in which the character information is displayed in an enlarged size on the whole of the normal display and non-display sections of the display unit;

wherein the display is controlled to select and maintain the enlarged display mode for a predetermined time in response to sensing that the display unit is inclined at the predetermined angle to the predetermined reference in the normal display mode, wherein when the character information is to be displayed in the normal display mode in the normal display section, first display data is read from areas of the storage device corresponding to dot areas of the matrix of the normal display section of the display unit, and the read first display data is displayed as the character information on the normal display section, wherein when the character information is to be displayed in the enlarged display mode on the whole of the normal display section and the normal non-display section provided outside the normal display section in a state in which the character information is displayed in the normal display mode on the normal display section, second display data stored in areas of the storage device corresponding to dot areas of the matrix of the normal display section arranged along said at least one side of the normal display section is copied into areas of the storage device corresponding to dot areas of the normal non-display section, and the copied second display data is read and displayed as incremental display information on the normal non-display section, and wherein the second display data corresponds to only a part of the first display data arranged along said at least one side.

* * * * *